US007619035B2

(12) United States Patent
Henning et al.

(10) Patent No.: US 7,619,035 B2
(45) Date of Patent: Nov. 17, 2009

(54) METHOD OF PRODUCING ADDITION PRODUCTS OF COMPOUNDS CONTAINING SIH GROUPS ONTO REACTANTS HAVING ONE DOUBLE BOND ON AQUEOUS MEDIA

(75) Inventors: Frauke Henning, Essen (DE); Wilfried Knott, Essen (DE)

(73) Assignee: Goldschmidt GmbH, Essen (DE)

( * ) Notice: Subject to any disclaimer, the term of this patent is extended or adjusted under 35 U.S.C. 154(b) by 351 days.

(21) Appl. No.: 11/464,963

(22) Filed: Aug. 16, 2006

(65) Prior Publication Data

US 2007/0043193 A1 Feb. 22, 2007

(30) Foreign Application Priority Data

Aug. 20, 2005 (DE) .................. 10 2005 039 398

(51) Int. Cl.
*C08G 77/06* (2006.01)
(52) U.S. Cl. ........................ 524/838; 528/15; 528/25; 528/31
(58) Field of Classification Search ................... None
See application file for complete search history.

(56) References Cited

U.S. PATENT DOCUMENTS

| 3,516,946 | A |   | 6/1970  | Modie |           |
|-----------|---|---|---------|-----------------|-----------|
| 3,775,452 | A |   | 11/1973 | Karstedt |        |
| 3,814,730 | A |   | 6/1974  | Karstedt |        |
| 4,288,345 | A |   | 9/1981  | Ashby et al. |    |
| 5,908,951 | A | * | 6/1999  | Kobayashi et al. | 556/479 |
| 6,437,162 | B1 |  | 8/2002  | O'Lenick, Jr. |   |
| 6,593,422 | B2 | * | 7/2003  | Lin | 524/837 |
| 6,706,811 | B2 | * | 3/2004  | Ohashi | 524/837 |
| 6,878,733 | B1 |  | 4/2005  | Shenoy et al. |   |
| 2002/0114771 | A1 | * | 8/2002 | Nakanishi | 424/70.12 |
| 2004/0132951 | A1 |   | 7/2004 | Burkhart et al. | |

FOREIGN PATENT DOCUMENTS

| DE | 26 46 726    | 4/1978  |
| DE | 41 16 419 C1 | 8/1992  |
| EP | 0 075 703    | 4/1983  |
| EP | 0 118 824    | 9/1984  |
| EP | 0 308 260 A2 | 3/1989  |
| EP | 0 398 684 A2 | 11/1990 |
| EP | 1 431 331 A1 | 6/2004  |
| EP | 1 520 870 A1 | 4/2005  |
| JP | 60018525     | 1/1985  |
| JP | 07304627 A   | 11/1995 |
| JP | 09012723 A   | 1/1997  |
| WO | WO 98/00463  | 1/1998  |

OTHER PUBLICATIONS

Abstract for JP 2-302438 (Dec. 1990).*
Michael A. Brook, Silicon in Organic, Organometallic, and Polymer Chemistry, Formation of SI—C Bonds, pp. 404-407.
Michael A. Brook, Silicon in Organic, Organometallic, and Polymer Chemistry, Formation of SI—C Bonds, pp. 176-177.
Wu et al, "A highly region-and stereoselective transition metal-catalyzed hydrosilylation of terminal alkynes under ambient contitions of air, water, and room temperature", ChemComm, pp. 1668-1669, Feb. 25, 2003.
Ichinohe et al, "Non-Odor Type of Polyether Modified Silicones for Cosmetic", J. Soc.Cosmet.Chem.Jpn, pp. 297-303, 1993.
Walter Noll, Chemie Und Technologie Der Silicone, 1960, pp. 40-43.

* cited by examiner

*Primary Examiner*—Marc S Zimmer
(74) *Attorney, Agent, or Firm*—Frommer Lawrence & Haug LLP

(57) ABSTRACT

The invention relates to a method of producing organically modified siloxanes and silanes by noble-metal-catalyzed reaction of siloxanes and/or silanes having at least one SiH group with a compound having one double bond, wherein the reaction is carried out in the presence of water.

14 Claims, No Drawings

METHOD OF PRODUCING ADDITION PRODUCTS OF COMPOUNDS CONTAINING SIH GROUPS ONTO REACTANTS HAVING ONE DOUBLE BOND ON AQUEOUS MEDIA

Any foregoing applications, and all documents cited therein or during their prosecution ("application cited documents") and all documents cited or referenced in the application cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention. Citation or identification of any document in this application is not an admission that such document is available as prior art to the present invention.

The invention relates to a novel method of producing addition products of compounds containing SiH groups onto reactants having one double bond in aqueous media.

As a result of the large number of combination possibilities between silanes or siloxanes containing SiH groups and olefinically unsaturated compounds, the noble-metal-catalyzed hydrosilylation reaction gives access to a broad spectrum of modified silanes or siloxanes.

It is known that the choice of suitable solvents in the hydrosilylation reaction is largely restricted, particularly with regard to the use of alcohols and, in particular, water. If such solvents are present, the SiC linkage reaction steps into the background compared with the SiOC bond formation, and alcoholysis or hydrolysis of the reactive SiH function takes place (Michael A. Brook, Silicon in Organic, Organometallic and Polymer Chemistry, John Wiley and Sons, Inc., New York, 1999, p. 176, p. 406).

One exception of this water- and air-induced degradation of active SiHs is the highly efficient, stereoselective hydrosilylation, carried out at room temperature, of terminal alkynes with triethylsilane in the presence of an aminophosphine-modified divinyl-tetramethyldisiloxane platinum complex (Chemical Communications (Cambridge, United Kingdom) 2003, 14, 1668-1669).

The high reactivity of the terminal alkynes used and also of the low molecular weight silane substances ensure, through the high conversion rate, a preference for the desired SiC linkage reaction and make the exceptional situation in the described system clear.

U.S. Pat. No. 6,878,733 refers to the production of $(AB)_n$ block copolymers by chain-extending emulsion polyaddition of polydiorganosiloxanes having two terminal SiH groups with high molecular weight hydrocarbons having two terminal double bonds in water and in the presence of emulsifiers. As a result of the substituents with electron donor properties present in the neighboring position, these double bonds likewise have significantly increased reactivity.

Surprisingly, it has now been found that substance systems of considerably lower reactivity, such as substrates having olefin functions, such as, for example, vinyl- and/or allylpolyoxyalkylene compounds with compounds bearing either terminal or nonterminal SiH groups such as, for example, hydrogen siloxanes, can only be reacted in a controlled manner in the presence of water as reaction medium under the conditions of a transition-metal-catalyzed hydrosilylation. It is all the more surprising here that competing secondary reactions, such as, for example, the SiOC linkage, which is observed in purely organic solvents, rarely take place. This behavior is entirely unexpected for the person skilled in the art since the hydridically polarized SiH bond, upon reaction with ambident substrates (olefin function and hydroxy function represented in the molecule), exhibit the tendency, even in the absence of water, to form SiOC-based by-products.

The invention therefore provides a method of producing organically modified siloxanes and silanes by noble-metal-catalyzed reaction of a) siloxanes and/or silanes having at least one SiH group with
b) compounds which have one double bond in the molecule, wherein the reaction is carried out in
c) water as reaction medium.

The invention therefore further provides a method of producing organically modified siloxanes and silanes by noble-metal-catalyzed reaction of a) siloxanes and/or silanes having at least one nonterminal SiH group with
b) compounds which have one double bond in the molecule, wherein the reaction is carried out in
c) water as reaction medium.

The invention further provides aqueous reaction mixtures prepared by noble-metal-catalyzed reaction of a) siloxanes and/or silanes having at least one terminal and/or at least one nonterminal SiH group with
b) compounds which have one double bond in the molecule, wherein the reaction is carried out in the presence of
c) water as reaction medium.

The ability of the method to be carried out only in water, i.e. without the additional co-use of solvents, solubility promoters or emulsifiers, was not foreseeable on account of the known different solubility characteristics of the starting materials, and the nature of the catalysts used. Of particular surprise was the selective course of the reaction, i.e. the small proportion of undesired by-products.

Further subject-matters of the invention are defined by the contents of the dependent claims. It is also an object of the invention to not encompass within the invention any previously known product, process of making the product or method of using the product such that applicant(s) reserve the right and hereby disclose a disclaimer of any previously known product or processes.

It is further noted that the invention does not intend to encompass within the scope of the invention any product, process of making the product or method of using the product, which does not meet the written description and enablement requirements of the USPTO (35 U.S.C. 112, first paragraph) or the EPO (Article 83 of the EPC), such that applicant(s) reserve the right and hereby disclose a disclaimer of any previously product, method of making the product or process of using the product which does not meet this requirement.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

Suitable catalysts are metal complexes of the metals of subgroup VIII of the Periodic Table of the Elements and, of these, particularly the representatives of the platinum metals.

In one embodiment of the invention, the nobel metal catalysts are platinum catalysts. Their use for the hydrosilylation of silanes or siloxanes with SiH groups onto compounds with one or more olefinic double bonds is known and described, for example, in the book "Chemie und Technologie der Silicone" [Chemistry and technology of the silicones], Verlag Chemie, 1960, page 43, and in the patent literature, e.g. in DE-B-26 46 726 (U.S. Pat. No. 4,096,159), EP-A-0 075 703 (U.S. Pat. No. 4,417,068).

Suitable noble-metal catalysts for the hydrosilylation claimed here according to invention in the presence of water are, in principle, the platinum metal complexes that have been tried and tested in an organic matrix, such as, for example, the Karstedt catalyst, cis-diaminoplatinum(II) chloride, bis-μ-chloro (η²-cyclohexene)platinum(II) chloride etc. (U.S. Pat. No. 3,516,946, U.S. Pat. No. 4,288,345).

One embodiment of the platinum catalysts are platinum[(0)] complex catalysts, such as, for example, the known platinum complexes of unsaturated siloxanes, silanes, organopolysiloxanes and organosilanes as in U.S. Pat. No. 3,814,730 or WO-A-98/00463 and the so-called Karstedt catalysts as in U.S. Pat. No. 3,775,452.

However, other zero-valent platinum-olefin complexes, such as, for example, bis-1,5-cyclooctadieneplatinum[(0)] and trisnorborneneplatinum[(0)], tris(hepta-1,6-diene)diplatinum, (η²,η²-1,2,6,7-hepta-1,6-diene)(η²-1,2-hepta-1,6-diene) platinum and (η²-ethylene) (η²,η²-1,2,6,7-hepta-1,6-diene) platinum, are also suitable.

One embodiment of the platinum catalysts are olefin-modified platinum[(0)] catalysts, so-called WK catalysts, as described in EP-A-1 520 870 (U.S. Patent Application Publication 2005-075468).

The contents of the book "Chemie und Technologie der Silicone" [Chemistry and technology of the silicones], Verlag Chemie, 1960, of DE-B-26 46 726, EP-A-0 075 703, WO 98/00463, U.S. Pat. No. 3,516,946, U.S. Pat. No. 3,814,730, U.S. Pat. No. 3,775,452, U.S. Pat. No. 4,288,345, EP-A-1 520 870 are hereby incorporated as reference and serve as part of the disclosure content of the present invention.

The catalyst complexes are used as solids or in the form of catalyst solutions. The catalyst solutions are used in the system-dependent concentrations customary for hydrosilylation reactions. The amount of platinum catalyst to be used is essentially governed by the reactivity and the molecular weight of the reactants. In general the amount of catalyst used can be selected from the ranges of, about $10^{-2}$ to about $10^{-8}$ mol and about $10^{-3}$ to about $10^{-6}$ mol, per 1 mol of SiH groups in the silane or siloxane.

The catalysts can be used over a wide temperature range. To avoid secondary reactions, the temperature range is chosen to allow an acceptable compromise between desired product purity and production efficiency, e.g. >95% purity and processing time of less than 12 hours or >99% purity and processing time of less than 6 hours. The olefin-activated systems preferred according to the invention catalyze satisfactorily, with weak exothermy, above 50° C. To achieve higher throughput rates, the reaction temperature can also be increased considerably without resulting in deactivation and shut-down phenomena.

Usually, the reactions claimed according to the invention are carried out under atmospheric pressure, but may also be carried out under elevated pressure.

In one embodiment of the invention, the method is performed at atmospheric pressure, although pressure ranges deviating from this are—if desired—likewise possible.

The reactants, i.e. the silanes or siloxanes having SiH groups, and the organic compounds having olefinic double bonds, and methods for their production are known. The silanes or siloxanes are described, for example, in the book "Chemie und Technologie der Silicone" [Chemistry and technology of the silicones], Verlag Chemie, 1960.

The SiH groups in the siloxanes and silanes may be terminal and/or nonterminal.

Siloxanes which can be used according to the invention are compounds of the general formula (I)

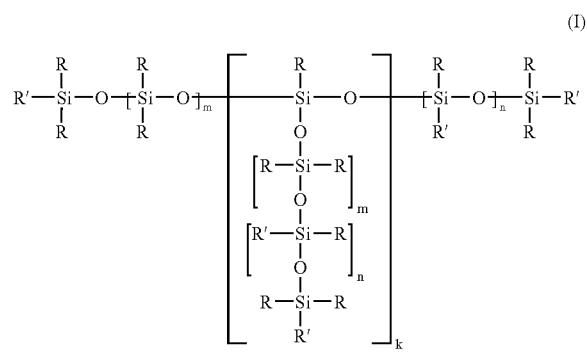

in which

R may be a hydrocarbon radical selected from the group consisting of a hydrocarbon radical having 1 to 20 carbon atoms, a hydrocarbon radical having 1 to 4 carbon atoms and a methyl group, R' may be hydrogen and/or R, m is selected from the ranges consisting of 0 to 500, 10 to 200, and 15 to 100, n is selected from the ranges consisting of 0 to 60, 0 to 30, and 0.1 to 25, k is selected from the ranges consisting of 0 to 10, and 0 to 4, with the proviso that R' is at least once hydrogen.

The siloxanes are technical-grade products in which the individual constituents of the moieties shown in the general formula (I) in brackets may be present in random distribution or in block form; they may also, as a result of the production, contain greater proportions of branching. The compounds preferred according to the invention are essentially linear. In proportions of at least 50%, preferably >90%, the radicals R are short-chain alkyl radicals, in particular methyl radicals.

Silanes which can be used according to the invention are compounds of the general formula $(R)_a$—$SiH_{4-a}$, in which R, identical or different, has the abovementioned meaning, and in one embodiment is an optionally substituted alkyl radical having 1 to 8 carbon atoms, and a may be 1 to 3.

One embodiment of the organosilicon compounds with SiH groups are:

$$(R')_3-Si-O-(-(R)_2Si-O-)_m \left[ \begin{array}{c} R \\ | \\ Si-O \\ | \\ O \\ | \\ ((R)_2-Si-O-)_m(-RHSiO-)_n-Si(R)_3 \end{array} \right]_k (-RHSiO-)_n-Si(R)_3$$

Here, R in the abovementioned formulae means groups which do not hinder the addition reaction, such as alkyl groups having 1 to 8 carbon atoms; substituted alkyl groups having 1 to 8 carbon atoms, such as the 3-chloropropyl group, 1-chloromethyl group, 3-cyano-propyl group; aryl groups, such as the phenyl group; aralkyl groups, such as the benzyl groups; alkoxy or alkoxyalkyl groups, such as the ethoxy or ethoxypropyl group. Within a molecule, R can also have different meanings. One embodiment of this aspect of the invention are compounds in which all of the radicals R or the majority of them have the meaning of a methyl radical.

Examples of the SiH-functional compounds are:
monomeric silanes, such as, for example, $R_3SiH$; $R_2SiH_2$; $RSiH_3$;
cyclic siloxanes, such as, for example, $(RHSiO)_4$; $(RHSiO)_3$;
linear or branched oligomeric or polymeric siloxanes, such as $R_3SiO-(R_2SiO-)_a(RSi(H)O-)_bSiR_3$, where a is $\geq 0$ and b is $\geq 1$; $HR_2SiO-(R_2SiO-)_c(RSi(H)O-)_dSiR_2H$, where c and d are $\geq 0$.

Compounds according to b) having one double bond per molecule which can be used according to the invention are compounds of the general formula $CH_2=CH-(CH_2)_b-Rb$ (III), in which
b may be 0 or 1 and
Rb is a hydrocarbon radical $-(O)_{x'}-R^{IV}$ in which
x' is 0 or 1,
$R^{IV}$ may be selected from the group consisting of an optionally substituted hydrocarbon radical having 7 to 47, and 13 to 37, carbon atoms, or Rb is a polyether radical of the general formula $-O-P_E$, in which
$P_E$ is any desired homo- or copolyether with blockwise arrangement or random distribution of the polyether segments $-(CH_2-CH(R_s)O)-R''$ in which
R'' is a hydrogen radical, or an alkyl group having 1 to 4 carbon atoms; the group $-C(O)-R'''$ where R'''=alkyl radicals; the group $-CH_2-O-R'$; an alkylaryl group, such as the benzyl group; the group $-C(O)NH-R'$, $-SO_3^-K^+$ $-COO^-K^+$ and $K^+$ is hydrogen or an organic or inorganic cation and
$R_s$ may be identical or different and is hydrogen, $C_{1-4}$-alkyl or aryl radicals.

The type and number of individual polyether segments and their distribution is uncritical for the method according to the invention per se and is primarily determined by the particular intended use of the reaction products and is known to the relevant person skilled in the art.

Examples of suitable organocarbon compounds with olefinic double bonds are compounds of the formulae $CH_2=CH-CH_2-O-(CH_2-CH_2O-)_x-(CH_2-CH(R')O-)_y-(SO)_z-R''$ $CH_2=CH-O-(CH_2-CH_2O-)_x-(CH_2-CH(R')O-)_y-R''$ $CH_2=CH-CH_2-R^{IV}$ $CH_2=CH-(O)_{x'}-R^{IV}$ in which
x=0 to 100,
x'=0 or 1,
y=0 to 100,
z=0 to 100,
R' is an optionally substituted alkyl group having 1 to 4 carbon atoms and
R'' is a hydrogen radical or an alkyl group having 1 to 4 carbon atoms; the group $-C(O)-R'''$ where R'''=alkyl radical; the group $-CH_2-O-R'$; an alkylaryl group, such as the benzyl group; the group $-C(O)NH-R'$, $-SO_3^-K^+$, $-COO^-K^+$ where $K^+$=hydrogen or an organic or inorganic cation,
$R^{IV}$ is selected from the group consisting of an optionally substituted hydrocarbon radical having 7 to 47, and 13 to 37, carbon atoms,
SO is the radical $-CH(C_6H_5)-CH_2-O-$.

Also suitable are, for example, compounds of the formulae $$CH_2=CH-CH_2-O-CH_2-CH\underset{O}{\overset{}{\diagdown\diagup}}CH_2$$

$$CH_2=CH-CH_2-O-CH_2-CH(OH)-CH_2-O-CH_3$$

$$CH_2=CH-CH_2-O-CH_2-CH_2-CN$$

The technical teaching claimed here according to the invention of a hydrosilylation, to be carried out in an aqueous medium, of olefinic substrates is of interest in particular against the background of an increasingly greater use of surface-active substances in the form of aqueous preparations. The requirement for solvent-free paint and coating systems quite generally has increasingly also expanded to demanding areas of application, such as, for example, to use water-based paint systems in the automobile sector.

The method according to the invention thus provides easy access to directly usable pigment wetting agents and dispersion additives which are, for example, in the form of a formulation of styrene oxide-containing polyether siloxanes in water.

An undesired secondary reaction during the hydrosilylation of allyl polyethers is their rearrangement to give the thermodynamically favored but no longer addition-capable propenyl polyethers. For this reason, the allyl component usually has to be used in excess. The hydrolysis, triggered by traces of acid and moisture, of the propenyl polyether present in the end product leads to the formation of propionaldehyde and its oligomers (aldoxanes, trioxanes) which arise from the silicone polyether at a delayed time and are thus responsible for its odor encumbrance. The hydrolysis-unstable propenyl polyether functions here as a type of reservoir from which odor carriers are subsequently continuously formed. The prior art discloses diverse methods for avoiding or overcoming the presented problems for systems based on allyl polyethers:

EP-A-0 775 717 describes organopolysiloxane-polyoxyalkylene copolymers as oils for cosmetic purposes with a total content of compounds bearing carbonyl groups (aldehydes+ketones) of ≦100 ppm and a peroxide content of ≦5 milliequivalents/kg of substance, which are obtained by using antioxidants in amounts of from 5 to 1000 ppm, optionally in the presence of a buffer, during the hydrosilylating linkage of already very pure allyl polyethers.

JP-A-07304627 teaches a method of treating organosiloxanes bearing allyl polyethers by mixing same with aqueous hydrochloric acid at 60° C. over the course of 24 hours. The achieved aldehyde content is ≦100 ppm and the odor test is negative.

A comparable procedure for the acid-induced hydrolysis of propenyl polyether moieties with the release and the thus facilitated removal of propionaldehyde is described in J. Soc. Cosmet. Chem. Japan (1993), 27(3), 297-303.

DE-A-41 16 419 (U.S. Pat. No. 5,225,509) deals with the elimination of undesired odor sources in the allyl polyether siloxane by heterogeneous-catalytic pressurized hydrogenation over nickel/kieselguhr catalysts, in which colorless clear products without a penetrating odor are obtained which are stable in the aqueous-acidic system and in a pH range from 3 to 4 over a period of 6 weeks.

EP-A-0 398 684 (U.S. Pat. Nos. 5,118,764 and 5,288,831) refers the production of low-odor polyoxyalkylene-silicone block copolymers by reacting a hydrogen siloxane with allyl polyethers in ethanol with a Pt catalyst, treating the reaction mixture with a dilute hydrochloric acid solution at elevated temperature for a few hours and then subjecting it to vacuum distillation, giving a virtually odorless copolymer.

Furthermore, the prior art describes the possibility of suppressing undesired odor in allyl polyether siloxanes through the addition of small amounts of phytic acid, although there remain in the system JP-A-60018525 (U.S. Pat. No. 4,515, 979).

Which alternative ways of avoiding the problems resulting from the allyl polyether isomerization are pursued is disclosed, for example, in EP-A-0 995 771, which claims a method of producing high-purity oxyalkylene-modified organopolysiloxanes using vinyl-oxy-terminated polyethers. This production route is not freely expandable for reasons of restricted avail-ability and increased raw material costs.

JP-A-09012723 also deals with an avoidance strategy which replaces hydrogen atoms in position 3 of the polyether-bonded alkyl group with hydrocarbon substituents. Naturally, a system modified in such a way suffers no allyl-propenyl rearrangement during the hydrosilylation.

EP-A-1 431 331 (U.S. Patent Application Publication 2004-132951) refers to a method in which the polyether siloxanes are firstly treated with $H_2O_2$ and are then freed from volatile constituents by the separation methods known per se.

The U.S. Pat. No. 6,437,162 refers to the treatment of dimethicone copolyol compounds with water at elevated temperature with subsequent distillation. The search is for a production method for organomodified silicones which reduces the by-product formation even during the synthesis.

Surprisingly, the method claimed according to the invention here makes it possible, particularly in the case of the production of polyether siloxanes that are derived from the platinum metal-catalyzed addition of allyl polyethers onto siloxanes which have SiH groups, to reduce the fraction of olfactorily undesired by-products even during the synthesis.

Moreover, the method claimed according to the invention offers the option of incorporating the water originating from the reaction medium in situ into polyether siloxanes in a more intensive manner than is possible via the route of reacting an unsaturated polyether with a hydrogen siloxane—whether without a diluent or in an organic solvent—and subsequent treatment with water.

This effect can be demonstrated, for example, by directly comparing the viscosities of a polyether siloxane produced in an aqueous medium, and a structurally identical polyether siloxane obtained without a diluent which has then been dissolved in water. This aspect is of significance for using the water-bearing polyether siloxane in all water-based formulations in which the rheological properties are impaired by higher viscosities.

The organosiloxanes and/or organosiloxane-water systems produced according to the invention can be used instead of the organomodified organosiloxanes used for all respective application purposes domestically and in industry, and in cleansing and care compositions for skin and skin appendages, but produced conventionally, and the aqueous systems based thereon. On account of the exceptionally advantageous rheological properties, they can, moreover, also be used for fields of use which have hitherto been inaccessible.

For example, but nonexhaustively, these are pigment wetting agents or dispersion additives for producing homogeneous, storage-stable pastes, paints and coatings; in antiperspirants/deodorants, and in pharmaceutical formulations.

The invention further provides the use of the organosiloxanes or organosiloxane-water systems produced according to the invention in compositions for the cleaning and care of hard surfaces, and also for the finishing, cleaning and care of textiles.

The invention further provides the use of the organomodified organosiloxanes or organosiloxane-water systems produced according to the method in the treatment and aftertreatment of textiles, e.g. as cleaning and care compositions, as impregnation compositions, brightening auxiliaries and hand improvers and textile softeners.

The invention further provides the use of the organosiloxanes or organosiloxane-water systems produced according to the invention in the production of polyurethane foams, e.g. as foam stabilizers, cell openers, release agents, etc.

The method is generally carried out by reacting the SiH compounds a) at least partially, i.e. largely, but preferably at least completely with the double bond of component b). The amount of water as reaction medium is predominantly uncritical. The amount is preferably such that, in the reaction mixture, it corresponds to the particular technical intended use, i.e. the mixture can be used directly for its intended use. However, the water should preferably constitute at least 50% by weight of the total reaction mixture.

The invention is further described by the following non-limiting examples which further illustrate the invention, and are not intended, nor should they be interpreted to, limit the scope of the invention.

EXAMPLES

The percentage SiH conversions specified in the examples are determined indirectly by treating the resulting reaction product with n-butanol in an alkaline medium and determining, by volumetric means, the amount of hydrogen which can be still cleaved off.

Example 1

According to the Invention

In a 500 ml four-necked flask, fitted with KPG stirrer, internal thermometer and reflux condenser, 25 g of a poly(methylhydrogen)dimethylsiloxane copolymer with a content of active hydrogen of 2.52 Val/g together with 69.04 g of an allylpolyoxyalkenol (average molecular weight about 843 g/mol, propylene oxide fraction/ethylene oxide fraction=29:71) are initially introduced into 94.04 g of distilled water with stirring.

The reaction matrix is heated to 70° C., then 5 ppm of an olefin-modified platinum$^0$-WK catalyst (Karstedt catalyst [$H_2C$=CH—Si($CH_3$)$_2$—O—Si—($CH_3$)$_2$—CH=$CH_2$]$_3$Pt$_2$ saturated with olefin, as described in EP-A-1 520 870) in the form of a 1.5% strength solution in decamethylcyclopentasiloxane are added using a Hamilton syringe. After about 30 minutes, the previously cloudy reaction mixture becomes clear. The SiH conversion, determined gas-volumetrically, after 2 hours (decomposition of a weighed-in amount of the reaction mixture using a sodium butoxide solution in a gas burette) is quantitative.

In the $^{29}$Si-NMR spectrum, the clear colorless reaction product exhibits no signal positions of any kind in the region of an SiOC-linked product. The dynamic viscosity of the sample is at 206 mPas (25° C.).

Example 2

Not According to the Invention

Analogously to Example 1, 25 g of a poly(methylhydrogen)dimethylsiloxane copolymer with a content of active hydrogen of 2.52 Val/g together with 69.04 g of an allylpolyoxyalkylenol (average molecular weight about 843 g/mol, propylene oxide fraction/ethylene oxide fraction=29:71) are heated to 70° C. with stirring, then 5 ppm of the olefin-modified platinum$^0$ catalyst according to example 1 in the form of a 1.5% strength solution in decamethylcyclopentasiloxane are added using a Hamilton syringe.

After about 30 minutes, the previously cloudy reaction system becomes clear. The SiH conversion, determined gas-volumetrically, after 2 hours (decomposition of a weighed-in amount of the reaction mixture with the help of a sodium butoxide solution in a gas burette) is quantitative.

The clear, yellow-brownish polyether siloxane has a dynamic viscosity of about 450 mPas and is then dissolved with a fraction of 50 m-% in distilled water. The dynamic viscosity of the resulting aqueous solution is determined as 743 mPas.

Example 3

Not According to the Invention 12.07 g of a poly(methylhydrogen)dimethylsiloxane copolymer with α,ω-SiH functions and an average molecular weight of 2778 g/mol and with an SiH content of 5.58 Val/kg, together with 100 g of a butanediol monovinyl ether initiated polyether, which has an average molecular weight of about 1100 g/mol and consists of 75% of ethylene oxide units and of 25% of styrene oxide units are initially introduced with stirring. The reaction matrix is heated to 90° C., then 10 ppm of an olefin-modified platinum$^0$ catalyst as in example 1 in the form of a 1.5% strength solution in decamethylcyclopentasiloxane are added using a Hamilton syringe. After 3.5 hours, a further 5 ppm of the platinum catalyst designated here are added. After 5 hours, the gas-volumetrically determined SiH conversion of the brown, cloudy reaction mixture is 98.7%. Part of the resulting polyether siloxane is processed with distilled water to give a 40% strength, slightly cloudy solution. After storage for a few days, the undiluted product exhibits a tendency for phase separation and becomes inhomogeneous.

Example 4

According to the Invention

Analogously to example 3, 12.07 g of a poly(methyl-hydrogen)dimethylsiloxane copolymer with α,ω-SiH functions and an average molecular weight of 2778 g/mol and with an SiH content of 5.58 Val/kg, together with 100 g of a butanediol monovinyl ether initiated polyether, which has an average molecular weight of about 1100 g/mol and consists of 75% of ethylene oxide units and of 25% of styrene oxide units are initially introduced into 112.07 g of distilled water with stirring. The reaction matrix is heated to 70° C., then 10 ppm of an olefin-modified platinum$^0$ catalyst as in example 1 in the form of a 1.5% strength solution in decamethylcyclopentasiloxane are added using a Hamilton syringe. After 5 and 9 hours, a further 10 ppm of the platinum catalyst designated here are added in each case. After 11 hours, the previously cloudy reaction mixture becomes clear. After 13 hours, the gas-volumetrically determined SiH conversion is quantitative.

In the $^{29}$Si-NMR spectrum, the clear, colorless reaction product exhibits no signal positions of any type in the region of an SiOC-linked product.

Example 5

According to the Invention

Analogously to example 1, in a 500 ml four-necked flask fitted with KPG stirrer, internal thermometer and reflux condenser, 25 g of a poly(methylhydrogen)dimethylsiloxane copolymer with a content of active hydrogen of 2.55 Val/g together with 72.6 g of an allylpolyoxyalkylenol (average molecular weight about 843 g/mol, propylene oxide fraction/ethylene oxide fraction=29:71) are initially introduced into 97.6 g of distilled water with stirring.

The reaction matrix is heated to 70° C., then 3.5 mg of bis-β-chloro (η$^2$-cyclohexene)platinum(II) chloride are added. After about 30 minutes, a quantitative SiH conversion is achieved. A clear, pale brownish colored liquid with a dynamic viscosity of 268 mPas (25° C.) is obtained.

Example 6

According to the Invention

Corresponding to example 1 and 5, in a 500 ml four-necked flask fitted with KPG stirrer, internal thermometer and reflux condenser, 25.0 g of a poly(methyl-hydrogen)dimethylsiloxane copolymer with a content of active hydrogen of 2.55 Val/g, together with 72.6 g of an allylpolyoxyalkylenol (average molecular weight about 843 g/mol, propylene oxide fraction/ethylene oxide fraction=29:71) are initially introduced into 97.6 g of distilled water with stirring.

The reaction matrix is heated to 70° C., then 3.0 mg of cis-diaminoplatinum(II) chloride are added. After 60 minutes, the gas-volumetrically determined SiH conversion is quantitative.

The clear, pale brownish colored liquid has a dynamic viscosity of 206 mPas (25° C.).

Example 7

According to the Invention

In a 500 ml four-necked flask fitted with KPG stirrer, reflux condenser and internal thermometer, 171 g of an allylpolyoxyalkylenol with an average molecular weight of 843 g/mol and a propylene oxide content of 26% are heated to 70° C. with 171 g of distilled water with stirring. 5 ppm of platinum in the form of a platinum$^0$ catalyst modified as in EP-A-1 520 870 are added using a syringe, and then 70 g of a poly(methylhydrogen)dimethylsiloxane copolymer with a hydrogen content of 2.52 Val/kg are added quickly via a dropping funnel. The gas-volumetrically determined conversion is quantitative after 1.5 hours. The water is distilled at 100° C. to 120° C. This gives a clear and odorless product.

Example 8

Not According to the Invention

In a 500 ml four-necked flask with attached KPG stirrer, reflux condenser and internal thermometer, 195.6 g of an allylpolyoxyalkylenol with an average molecular weight of 843 g/mol and a propylene oxide content of 26% are heated to 70° C. with 70 g of a poly(methylhydrogen)dimethylsiloxane copolymer with a hydrogen content of 2.52 Val/kg with stirring. 5 ppm of platinum in the form of a platinum$^0$ catalyst modified as in EP-A-1 520 870 are added using a syringe. The gas-volumetrically determined conversion is quantitative after 2 hours. The resulting product is clear and has an odor characteristic of polyether siloxanes.

Example 9

According to the Invention

In a 500 ml four-necked flask with attached KPG stirrer, reflux condenser and internal thermometer, 179 g of an allylpolyoxyalkylenol with an average molecular weight of 1482 g/mol and a propylene oxide content of 58% are heated to 70° C. with 179 g of distilled water with stirring. 5 ppm of platinum in the form of a platinum$^0$ catalyst modified as in EP-A-1 520 870 are added using a syringe, and then 71 g of a poly(methylhydrogen)dimethylsiloxane copolymer with a hydrogen content of 1.27 Val/kg are added quickly via a dropping funnel. The gas-volumetrically determined conversion is quantitative after 2 hours. The water is distilled off at 100° C. to 120° C. The product is clear, odorless and has a viscosity of 925 mPas.

Example 10

Not According to the Invention

In a 500 ml four-necked flask with attached KPG stirrer, reflux condenser and internal thermometer, 179 g of an allylpolyoxyalkylenol with an average molecular weight of 1482 g/mol and a propylene oxide content of 58% are heated to 70° C. with 71 g of a poly(methylhydrogen)dimethylsiloxane copolymer with a hydrogen content of 1.27 Val/kg with stirring. 5 ppm of platinum in the form of a platinum$^0$ catalyst modified as in EP-A-1 520 870 are added using a syringe. The gas-volumetrically determined conversion is quantitative after 2 hours. The product is clear, has the characteristic odor and a viscosity of 867 mPas.

Example 11

According to the Invention

In a 500 ml four-necked flask with attached KPG stirrer, reflux condenser and internal thermometer, 162.5 g of an allylpolyoxyalkylenol with an average molecular weight of 1380 g/mol and a propylene oxide content of 23% are treated with 10 ppm of platinum$^0$ catalyst modified as in EP-A-1 520 870. In succession, 29.2 g of distilled water and 100 g of a poly(methyl-hydrogen)dimethylsiloxane copolymer with a hydrogen content of 0.94 Val/kg are added with stirring, and the reaction mixture is heated to 70° C. The gas-volumetrically determined conversion is quantitative after 2 hours. The water-containing, high-viscosity product, which is flowable at elevated temperature, is further used without distilling off water.

Example 12

Not According to the Invention

In a 500 ml four-necked flask with attached KPG stirrer, reflux condenser and internal thermometer, 162.5 g of an allylpolyoxyalkylenol with an average molecular weight of 1380 g/mol and a propylene oxide content of 23% are heated to 70° C. with 100 g of a poly(methylhydrogen)dimethylsiloxane copolymer with a hydrogen content of 0.94 Val/kg with stirring. 10 ppm of a platinum$^0$ catalyst modified as in EP-A-1 520 870 are added. The gas-volumetrically determined conversion is quantitative after 2 hours. The product is clear and has a viscosity of 12 810 mPas.

Example 13

According to the Invention

In a 500 ml four-necked flask with attached KPG stirrer, reflux condenser and internal thermometer, 100.0 g of an α,ω-dihydrogenpolydimethylsiloxane with a hydrogen content of 0.28 Val/kg and 46.2 g of distilled water are initially introduced. The mixture is heated to 70° C. and treated with 4 ppm of a platinum$^0$ catalyst modified as in EP-A-1 520 870. 54.0 g of an allylpolyoxyalkylenol with an average molecular weight of 1483 g/mol and a propylene oxide content of 58% are added dropwise over the course of 3 minutes. The gas-volumetrically determined conversion is quantitative after 2 hours. The water-containing, high-viscosity product, which is flowable at elevated temperature, is further used without distilling off water.

Example 14

Not According to the Invention

In a 500 ml four-necked flask with attached KPG stirrer, reflux condenser and internal thermometer, 81.0 g of an allylpolyoxyalkylenol with an average molecular weight of 1483 g/mol and a propylene oxide content of 58% are heated to 70° C. and treated with 4 ppm of a platinum⁰ catalyst modified as in EP-A-1 520 870. 150 g of an α,ω-dihydrogenpolydimethylsiloxane with a hydrogen content of 0.28 Val/kg are added dropwise over the course of 5 minutes. The gas-volumetrically determined conversion is quantitative after 2 hours. The product is clear and has a viscosity of 4255 mPas.

Example 15

According to the Invention

In a 500 ml four-necked flask with attached KPG stirrer, reflux condenser and internal thermometer, 65.0 g of heptamethyltrisiloxane and 22.3 g of distilled water are heated to 80° C. and treated with 8 ppm of a platinum⁰ catalyst modified as in EP-A-1 520 870. 158.0 g of a terminally sulfate-modified allylpolyethylene oxide with an average molecular weight of 400 g/mol are added dropwise over the course of 30 minutes. After one hour, the reaction mixture is clear. The gas-volumetrically determined conversion is 95.3% after 8 hours. 4 ppm of the platinum⁰ catalyst are added. After a further 2 hours, a conversion of 97.7% is achieved. At 130° C. in the oil pump vacuum, water and small residual amounts of unreacted heptamethyltrisiloxane are distilled off. The product clear, yellow and has a viscosity of 4386 mPas.

Investigation into Odor Carriers Bound in the Polyether Siloxane

The investigation into bound and free aldehydes in total is carried out as follows:

3 g of the product to be tested are dissolved in 10 g of distilled water, admixed with 1 g of a 2% strength aqueous citric acid solution and stirred for 30 minutes at room temperature. Using a gas-chromatographic analysis, the aldehydes are quantitatively determined. Example 7 represents a polyether siloxane prepared in water according to the invention and has a lower content of bound aldehydes than the polyether siloxane from example 8 prepared conventionally without a diluent.

| Example | Propionaldehyde [ppm] | Acetaldehyde [ppm] |
|---|---|---|
| Example 7 | 3500 | <1 |
| Example 8 | 4900 | 2 |

Application-Related Testing of the Styrene Oxide-Containing Polyether Siloxanes as Dispersion Additives in Coating Systems A black pigment paste based on Printex 95 (flame soot) is formulated as follows:

TABLE 1

| Distilled water | 47.8 g |
|---|---|
| Additive (as 40% strength solution in water) | 29.7 g |
| Foamex 830 | 1.0 g |
| Parmanetol K 40 | 0.1 g |
| Printex 95 | 20.0 g |

With the addition of milling balls, the pigment formulations are homogenized for 2 hours in the Disperser DAS 2000 from Lau.

This is followed by incorporating the black colored paste into the white paint Neocryl XK-90 using a high-speed stirrer. Using a 100μ box doctor-blade, the pigmented coating system is applied to test charts. In the drying phase, a rub-out test is carried out in order to test the efficiency of the stabilization of the dispersion.

Rub-Out Test:

In order to make, in particular, the vertical floating of pigments in coating films visible and measurable, the so-called rub-out test is carried out. For this, the coating film while still wet though already taken is rubbed with the finger or a brush. If the pigments have separated or are in highly flocculated form, the mechanical operation of rubbing induces them into a homogeneous distribution again. The target shade of the homogeneous mixture is produced. From the difference in color relative to the unrubbed film, the extent of the disruption is evident. The rub-out effect obtained can be either positive or negative. A positive rub-out effect means that the color strength of the unrubbed film is lower than that of the rubbed film, possibly attributable to the floating of white pigment. The opposite situation produces a negative rub-out effect.

Determination of the Calorimetric Values:

The pigmented paints and coatings drawn down onto cardboard charts (Leneta® chart) are measured using a calorimeter (SP 60, illuminant D 65/10, X-Rite) in the form of L*a*b* values, i.e. lightness, color tinge on the red/green scale, color tinge on the yellow/blue scale (table 2).

TABLE 2

| | Standard | | | Difference | | | | Gloss | |
|---|---|---|---|---|---|---|---|---|---|
| Sample | L* | a* | b* | ΔL* | Δa* | Δb* | ΔE* | 20 | 60 |
| Example 3 (not according to the invention) | 48.59 | −0.77 | −2.28 | 1.18 | −0.04 | −0.35 | 1.23 | 39.8 | 72.8 |
| Example 4 (according to the invention) | 50.44 | −0.83 | −2.57 | 0.41 | 0.00 | −0.19 | 0.45 | 44.0 | 74.6 |
| Reference | 49.62 | −0.82 | −2.46 | 0.58 | 0.01 | −0.26 | 0.64 | 48.0 | 76.8 |

The contribution of the dispersants produced according to the invention to suppressing the flocculation tendency can—for good lightness and gloss values—be made impressively clear particularly with reference to the result of the rub-out test of the dispersion additive produced by the method claimed according to the invention, with 0.45, compared with 0.64 in the reference system and 1.23 for the system not produced according to the invention.

Applications-related testing of the polyether siloxane produced according to the invention as polyurethane rigid foam stabilizer.

The polyether siloxane according to the invention described in example 7 was foamed compared to the conventionally produced polyether siloxane from example 8 of PU rigid foam stabilizer in the following formulation:

Mass [g] Component
95.0 Sorbitol/glycerol-started polyether polyol (OH number 470)
2.5 Water
1.4 Dimethylcyclohexylamine
1.4 Stabilizer
12.4 Cyclopentane
188.6 Polymeric MDI (NCO content 31.6%)

The formulation was foamed in a hand-mixing process. For this, polyol, water, amine catalyst, stabilizer produced conventionally or according to the invention, and propellant were weighed into a beaker and mixed using a plate stirrer (6 cm in diameter) for 30 s at 1000 rpm. By weighing again, the amount of propellant evaporated during the mixing operation was determined and made up again. The MDI was then added, the reaction mixture was stirred with the described stirrer for 7 s at 2500 rpm and immediately introduced into a mold measuring 145 cm×14.5 cm×3.5 cm lined with poly-ethylene film and heated to 45° C. Along its longest side, the mold had an inclined angle of 10°, and filling took place at a distance of 40 cm from the lower end. (The amount of foam formulation and the volume of the mold are such that the foam does not completely fill the mold and the length of the foam molding produced can be regarded as a measure of the volume flow of the foam.) After 10 min, the foam was removed from the mold and assessed. Surface and internal defects were evaluated subjectively, being awarded grades from 1 (worst) to 10 (best). The pore structure (average number of cells per 1 cm) was assessed visually at a cut surface by comparison with comparison foams. The length of the foam molding was measured and standardized to a standard foam weight (260 g) and atmospheric pressure (1.013 mbar) according to the following formula:

Standardized flow length=(260 g*foam length*air pressure)/(foam weight*1.013 mbar)

Results:

|  | Stabilizer | | | | | | | | | |
| --- | --- | --- | --- | --- | --- | --- | --- | --- | --- | --- |
|  | T | S | B | I | Z | G | H | D | L | ΔL |
| Example 7 | 1.5 | 5 | 4-5 | 4 | 36-40 | 259.5 | 136.5 | 763 | 137.3 | −0.2% |
| Example 8 | 1.5 | 5 | 4 | 4 | 36-40 | 257.4 | 136 | 763 | 137.6 | — |

T = Parts
S = Surface
B = Base zone
I = Internal defects
Z = Pore structure [cells/cm]
G = Foam weight
H = Foam height
D = Air pressure [torr]
L = Standardized flow length according to the above definition
ΔL = Flow difference Applications-Related Testing of the Polyether Siloxane Produced According to the Invention as Polyurethane Flexible Foam Stabilizer The applications-related testing of the polyether siloxane produced according to the invention and described in example 9 compared with conventionally produced polyether siloxane from example 10 is carried out using a foam formulation in the following way:

In each case 100 parts by weight of a standard commercial polyether for producing flexible polyurethane foams (OH number: 56 mg/g) which had, in the average molecule, three hydroxy groups and a molecular weight of about 3500 g/mol, was mixed with 4.05 parts by weight of water, 1.2 parts by weight of the polyether siloxane to be tested, 0.2 parts by weight of dimethylethanolamine and 0.2 parts by weight of tin octoate using a plate stirrer. After adding 52.5 parts by weight of toluene diisocyanate (isomer mixture 2,4 to 2,6 in the ratio of 4:1), the mixture was homogenized using a stirrer for 7 seconds at 2500 rpm and poured into a box (30×30×30 cm) open at the top. A polyurethane foam is produced. The influence of the polyether siloxane on the foaming process is described by the following parameters:

1. The sagging of the foam at the end of the rise phase (measured as the difference between the height at the time of discharge and the height 3 minutes later) also referred to below as "sag".
2. The number of cells per centimeter of foam is determined using a microscope.
3. The open-pored nature of the foam is determined by means of a back-pressure measurement and is prior art. Here, the back-pressure is measured in mm water column.

The table below compares the results of the stabilizer obtained by example 9 according to the invention, and by example 10 not according to the invention:

|  | Stabilizer | | | | | |
| --- | --- | --- | --- | --- | --- | --- |
|  | T | R | Z | St | G | P |
| Example 9 | 1.2 | −0.2 | 16 | 97 | 25.7 | 9 |
| Example 10 | 1.2 | −0.1 | 16 | 100 | 25.6 | 10 |

T = Parts of stabilizer
R = Sag [cm]
Z = Cells per centimeter
St = Rise time [s]
G = Density [kg/m$^2$]
P = Back-pressure [mm]

Applications-Related Testing of the Polyether Siloxane Produced According to the Invention as Textile Auxiliary Polyether-modified siloxanes are used as additives in textile auxiliary formulations and "topical softener" applications of tissue paper. In both fields of application, these impart a smooth surface to the fabrics or paper and thus produce a softening effect. The polyether siloxane from example 11 produced according to the invention is comparable in its property as additive in textile auxiliaries and as topical softener on tissue paper both in the formulatability and also application with the conventionally produced polyether siloxane from example 12.

Formulatability

35% strength solutions are prepared from the polyether siloxanes of examples 11 and 12 at room temperature by adding distilled water with stirring using a dissolver disc. In both cases, a clear to slightly cloudy product with a viscosity of about 100 mPas at 20° C. is obtained.

Application—Use as Hydrophilic Component in a Softener Formulation for Fabric and Nonwovens The same amounts in each case of the polyether siloxane from example 11 produced according to the invention and of the conventionally produced polyether siloxane from example 12 are incorporated into a standard formulation as follows: 5.2 parts of a nonionic emulsifier (e.g. a polyethylene glycol alkoxylate which is derived from a fatty alcohol and ten ethylene glycol units), 8.5 parts of butyl diglycol and 16.6 parts of polyether siloxanes are placed in a beaker and homogenized at 35 to 40° C. with stirring. Then, at room temperature, 57.3 parts of water are slowly added with stirring. Finally, 12.3 parts of a silicone quat heated to 45 to 50° C. are slowly stirred in portions. The mixture is stirred at 45 to 50° C. for 30 minutes and bottled after cooling. Between 0.003 g of product per gram of textile ware (hand sample) and 0.025 g of product per gram of textile ware (rewettability) of the formulation produced in this way are applied to woven, knitted and terry cotton fabrics by pad-mangle application. A comparison is made between the hand property (panel test, 25=best, 0=poor) on various types of fabric and the rewettability (height-increase method). The table documents a comparable quality of the polyether siloxane produced according to the invention and produced conventionally.

| Formulation with | Ex. 12 | Ex. 11 |
| --- | --- | --- |
| Soft hand - terry fabric (total points max. 25) | 14 | 13 |
| Soft hand - knitted fabric (total points max. 25) | 19 | 20 |
| Rewetting behavior (% blank value) | 83 | 80 |

Application—Spraying on Tissue Paper Short-Fiber/Long-Fiber 1/1

In each case a 10% strength solution in water is prepared from the polyether siloxane produced according to the invention (example 11) and the conventionally produced polyether siloxane (example 12), and identical amounts are applied by spraying onto sheets of paper. After drying and conditioning at 21° C. and 50% rel. atmospheric humidity, the tear strength, the water absorption and the softness (panel test, 35 best, 0 poor) are compared. The results in the table document a comparable product quality.

| Dilution with | Ex. 12 | Ex. 11 |
| --- | --- | --- |
| Softness (total points max. 35) | 30 | 29 |
| Absorption (0-5 s; g/g/s) | 0.17 | 0.16 |
| Absorption capacity (20 s; g/g) | 1.95 | 1.85 |
| Tear strength (kNm/kg) | 1.80 | 1.85 |

Having thus described in detail various embodiments of the present invention, it is to be understood that the invention defined by the above paragraphs is not to be limited to particular details set forth in the above description as many apparent variations thereof are possible without departing from the spirit or scope of the present invention.

The invention claimed is:

1. A method of producing an aqueous solution comprising of organically modified siloxanes and silanes by noble-metal-catalyzed reaction of
   a) siloxanes and/or silanes having at least one SiH group with
   b) compounds which have one double bond per molecule, wherein the reaction is carried out in
   c) water as reaction medium.

2. The method of claim 1, wherein one or more siloxanes which have non-terminal SiH groups are used as component a).

3. The method of claim 1, wherein the reaction is catalyzed by metal complexes of subgroup VIII of the Periodic Table of the Elements.

4. The method of claim 1, wherein the reaction is catalyzed by metal complexes of the platinum metals.

5. The method of claim 1, wherein the reaction is catalyzed by metal complexes of the Karstedt type.

6. The method of claim 5, wherein the siloxane is of the general formula (I):

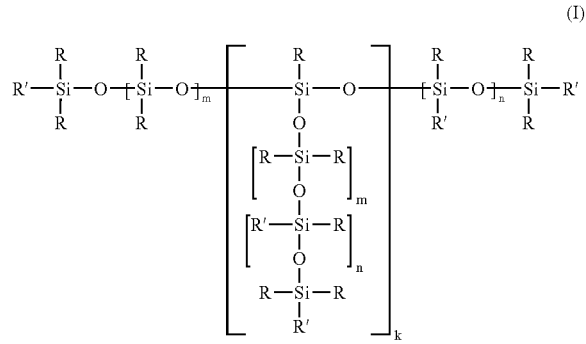

in which
R may be a hydrocarbon radical selected from the group consisting of a hydrocarbon radical having 1 to 20 carbon atoms, a hydrocarbon radical having 1 to 4 carbon atoms and a methyl group,
R' may be hydrogen and/or R,
m is selected from the ranges consisting of 0 to 500, 10 to 200, and 15 to 100,
n is selected from the ranges consisting of 0 to 60, 0 to 30, and 0.1 to 25,
k is selected from the ranges consisting of 0 to 10, and 0 to 4,
with the proviso that R' is at least once hydrogen.

7. The method of claim 6, wherein:
R is a methyl group,
R' is hydrogen and/or R,
m is 15 to 100,
n is 0.1 to 25,
k is 0 to 4,
with the proviso that R' is at least once hydrogen.

8. The method of claim 5, wherein compounds according to b) having one double bond per molecule are compounds of the general formula $CH_2=CH-(CH_2)_b-Rb$ (III),
in which
b may be 0 or 1 and
Rb is a hydrocarbon radical $-(O)_{x'}-R^{IV}$
in which
x' is 0 or 1,
$R^{IV}$ may be selected from the group consisting of an optionally substituted hydrocarbon radical having 7 to 47 carbon atoms, or Rb is a polyether radical of the general formula $-O-P_E$,
in which
$P_E$ is any desired homo- or copolyether with blockwise arrangement or random distribution of the polyether segments $-(CH_2-CH(R_S)O)-R''$
in which
R" is a hydrogen radical, or an alkyl group having 1 to 4 carbon atoms; the group $-C(O)-R'''$ where $R'''$=alkyl radicals; the group $-CH_2-O-R'$; an alkylaryl group, such as the benzyl group; the group $-C(O)NH-R'$, $-SO_3^-K^+$ $-COO^-K^+$ and $K^+$ is hydrogen or an organic or inorganic cation and
$R_s$ may be identical or different and is hydrogen, $C_{1-4}$-alkyl or aryl radicals.

9. The method of claim 8, wherein the compounds according to b) are selected from the group consisting of:

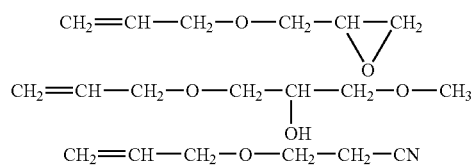

$CH_2=CH-CH_2-O-(CH_2-CH_2O-)_x-(CH_2-CH(R')O-)_y-(SO)_z-R'';$
$CH_2=CH-O-(CH_2-CH_2O-)_x-(CH_2-CH(R')O-)_y-R'';$
$CH_2=CH-CH_2R^{IV};$ and
$CH_2=CH-(O)_{x'}-R^{IV};$ in which
x=0 to 100,
x'=0 or 1,
y=0 to 100,
z=0 to 100,
R' is an optionally substituted alkyl group having 1 to 4 carbon atoms and
R" is a hydrogen radical or an alkyl group having 1 to 4 carbon atoms; the group $-C(O)-R'''$ where $R'''$=alkyl radical; the group $-CH_2-O-R'$; an alkylaryl group, such as the benzyl group; the group $-C(O)NH-R'$, $-SO_3^-K^+$, $-COO^-K^+$ where $K^+$=hydrogen or an organic or inorganic cation,
$R^{IV}$ is selected from the group consisting of an optionally substituted hydrocarbon radical having 7 to 47, and 13 to 37, carbon atoms,
SO is the radical $-CH(C_6H_5)-CH_2-O-$.

10. The method of claim 7, wherein the compounds according to b) are selected from the group consisting of:

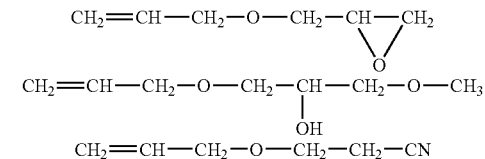

$CH_2=CH-CH_2-O-(CH_2-CH_2O-)_x-(CH_2-CH(R')O-)_y-(SO)_z-R'';$
$CH_2=CH-O-(CH_2-CH_2O-)_x-(CH_2-CH(R')O-)_y-R'';$
$CH_2=CH-CH_2R^{IV};$ and
$CH_2=CH-(O)_{x'}-R^{IV};$ in which
x=0 to 100,
x'=0 or 1,
y=0 to 100,
z=0 to 100,
R' is an optionally substituted alkyl group having 1 to 4 carbon atoms and
R" is a hydrogen radical or an alkyl group having 1 to 4 carbon atoms; the group $-C(O)-R'''$ where $R'''$=alkyl radical; the group $-CH_2-O-R'$; an alkylaryl group, such as the benzyl group; the group $-C(O)NH-R'$, $-SO_3^-K^+$, $-COO^-K^+$ where $K^+$=hydrogen or an organic or inorganic cation,
$R^{IV}$ is selected from the group consisting of an optionally substituted hydrocarbon radical having 7 to 47, and 13 to 37, carbon atoms,
SO is the radical $-CH(C_6H_5)-CH_2-O-$.

11. The method of claim 8, wherein $R^{IV}$ may be selected from the group consisting of an optionally substituted hydrocarbon radical having 13 to 37 carbon atoms.

12. The method of claim 2, wherein the reaction is catalyzed by metal complexes of the platinum metals.

13. The method of claim 12, wherein the composition is odorless.

14. The method of claim 13, wherein the amount of water is at least 50% by weight of the total weight of a), b) and c).

* * * * *

UNITED STATES PATENT AND TRADEMARK OFFICE
CERTIFICATE OF CORRECTION

PATENT NO. : 7,619,035 B2 Page 1 of 1
APPLICATION NO. : 11/464963
DATED : November 17, 2009
INVENTOR(S) : Henning et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 444 days.

Signed and Sealed this

Twenty-sixth Day of October, 2010

David J. Kappos
*Director of the United States Patent and Trademark Office*